Patented Oct. 25, 1938

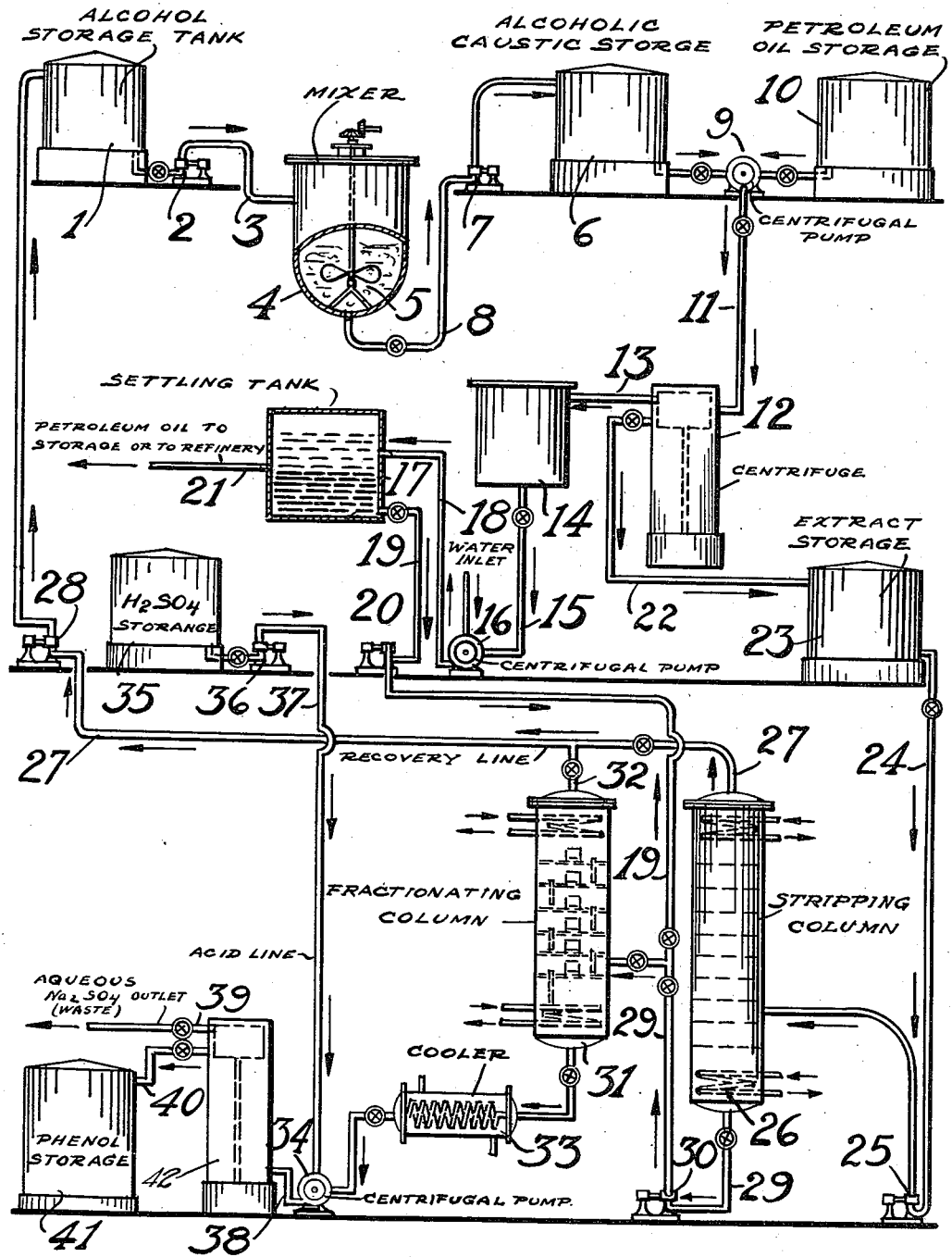

2,134,547

UNITED STATES PATENT OFFICE 2,134,547

PETROLEUM PHENOLIC MATERIAL

Hyym E. Buc, Roselle, N. J., assignor to Standard Oil Development Company, a corporation of Delaware Application April 14, 1937, Serial No. 136,738

13 Claims. (Cl. 260—154)

This invention relates to the separation of phenolic materials in a concentrated state from certain petroleum oils. More specifically, it deals with an inexpensive method for segregating high molecular weight phenolic bodies having superior properties and varied uses.

The phenols prepared according to the present invention differ from other phenolic bodies recovered from various sources in the respect that they are unextractable from their source materials with aqueous alkali. In addition to this, they differ in the fact that they are highly soluble in hydrocarbons and form derivatives having high hydrocarbon solubility. They also possess other unique properties which will become apparent as the description proceeds.

The raw materials employed as sources for the phenolic bodies described herein are petroleum hydrocarbons, preferably those boiling above 500° F., or 600° F. Straight run or cracked distillates of East India, South American or Mexican crudes are highly suitable since they appear to be richest in these compounds. Gas oils, lubricating oils and kerosenes are amenable to this treatment, although destructively hydrogenated oils of petroleum origin are not as suitable as the stocks outlined above. Generally, the concentration of the desired phenolic substances in such stocks varies from about 0.1% to 2%.

In extracting these phenolic bodies, the solvent generally employed is a solution of a strong alkali in a substantially anhydrous solvent selective for phenols and which is not reactive with the alkali employed and which is substantially immiscible in the petroleum source material to be treated. As pointed out previously, aqueous alkali will not extract the desired phenolic compounds. In fact, it is often desirable to make a preliminary extraction with an aqueous alkali to remove foreign acidic substances (which are removable thereby) prior to extraction by the present method.

As a strong alkali, the alkali metal bases such as caustic soda or caustic potash or onium type bases such as trimethyl sulfonium hydroxide, benzyl trimethyl hydroxide, and the like may be employed. The solvent employed may be a lower alcohol such as the aliphatic alcohols (methyl, ethyl, isopropyl), or glycols, glycerols, polyglycols and polyglycerols, dioxan, glycol or glycerol mono esters, or other similar compounds. It is desirable that no more than about 5% water be present in such solvents. The amount of alkali employed varies from 3% to 15% of the solvent used or more, depending on the concentration of the phenolic bodies, the type of stock treated, and the like. About 1% to 10% by volume (on the oil treated) of solvent is generally employed to obtain good extraction. The preferred extraction temperature is room temperature, although lower (down to —30° C.) or higher (up to 100° C.) temperatures may be advantageously employed. Countercurrent extraction may also be used.

The invention can be more clearly understood from the accompanying drawing which shows, in semi-diagrammatic elevation, one type of process for carrying out this invention.

Referring to the drawing, reference numeral 1 designates a storage vessel for a lower alcohol such as methanol. This alcohol is withdrawn from tank 1 by pump 2 through pipe 3 into mixer 4 which contains caustic 5. The alcoholic caustic so prepared is then pumped into storage 6 by pump 7 and line 8. From storage tank 6, the alcoholic caustic is led into centrifugal pump 9 into which is also led the oil containing phenolic bodies, drawn out of storage tank 10.

In the centrifugal pump, the mixture is dispersed into a form of an emulsion or suspension so as to effect efficient extraction of the phenolic compounds from the oil. This suspension is led through line 11 into centrifuge (or centrifuges) 12 wherein the immiscible layers are separated, the extracted oil layer being drawn off at line 13 and stored in tank 14. This oil may be washed with water by leading it into line 15 and centrifugal pump 16 so as to remove the dissolved alcohol. The suspension is led into settling tank 17 through line 18, and the aqueous alcohol layer is run into line 19 through pump 20 into a recovery still, while the washed oil layer is drawn off through line 21 and sent to storage or to further processing in a refinery.

Returning to centrifuge 12, the phenolic extract containing most of the alcohol is drawn off thru line 22 into a storage tank 23 from which it is pumped thru line 24 by pump 25 into stripping column 26 which recovers the anhydrous alcohol by distillation. This alcohol is sent thru line 27 by pump 28, into the alcohol storage tank 1.

The bottoms from the stripping still which are now rich in the phenolic compounds are pumped thru line 29 by pump 30 and sent into fractionating column 31 together with the wash liquor from line 19. The alcohol distilled off is led through line 32 into the recovery line 27, while the bottoms consisting of aqueous phenolic compounds are drawn off through cooler 33 and into centrifugal pump 34 wherein it is intimately mixed with acid from tank 35 pumped into line 37 by pump 36. The suspension of these ingredients containing free liberated phenolic compounds insoluble in water is run into centrifuge (or centrifuges) 42 by line 38 in which the phenolic materials are separated from the inorganic salts. The latter are discarded through line 39 while the phenols are drawn off at line 40 and stored in drum 41.

Although the regeneration of the phenols is generally done with an inorganic acid, an organic acid may be used, and if other acid bodies are present in the phenols, carbon dioxide may be employed as a regenerating agent.

The phenolic compounds so obtained are generally liquid mixtures of a large number of individual compounds varying in viscosity and boiling point, the values of these properties increasing with increase in boiling point of the petroleum source material. They range from about 11 carbon atoms per molecule to 27 or more. In the case of the higher boiling fractions, there is a deficiency of hydrogen which indicates the presence of more than one nucleus, or a condensed nucleus.

These phenolic compounds can be reduced to alcohols or hydrocarbons, sulfated or sulfonated to give wetting agents, detergents and emulsifiers, nitrated, condensed with aldehydes, sulfur chloride, ketones, and the like to produce resins, coupled with diazotized materials to give dyes, and employed in reactions characteristic of phenolic compounds.

They are especially suitable as antioxidants for lubricating oils, gasoline, fatty oils, waxes, etc. and as color stabilizers for various organic materials. The lower molecular weight compounds are effective as germicides, fungicides and insecticides. The more viscous compounds and their derivatives are highly suitable as lubricants and impregnating agents since they possess low viscosity indices and high spontaneous ignition temperatures. The esters of these compounds with organic or inorganic acids (e. g. phosphoric, carbonic, stearic, acetic, propionic, boric, silicic, furoic, phthalic, maleic, benzoic, chloracetic, naphthenic, abietic, and the like) are especially useful as lubricating agents or as addition agents to lubricating compositions or fuels, or as plasticizers and solvents for resins and plastics, as insecticides, fungicides, etc., as dust collecting agents on fibrous materials, as lustering agents for textiles, as insulating compounds and oils, and as ingredients in emulsions, textile oils, process oils, greases, industrial oils and the like, with or without the addition of other materials such as oxidation inhibitors (e. g. thio beta naphthol) dyes, mineral oils, fatty oils, polymers, etc.

The following examples illustrate many of the phases involved in the present invention:

*Example 1*

Heavy Talang Akar kerosene (15 gals.) boiling substantially above 500° F. was extracted with about ½ gal. of methyl alcohol containing ½ lb. of potassium hydroxide. The mixture was centrifuged, the alcoholic layer distilled, and upon acidification of the residue 128 gms. of crude phenols were recovered. These were vacuum distilled at 5-8 mm. pressure to give the following fractions:

| Fraction | B. P., °F. | Grams | Color |
|---|---|---|---|
| 1 | To 313 | 6.1 | Pale yellow. |
| 2 | 313-440 | 94.0 | Light brown. |
| 3 | 410- | 11.0 | Red brown. |
| Residue | | 16.3 | Brown tar. |

The second fraction diluted 1:1000 gave a phenol number of 100, equivalent to 100 g./100 cc. based on tertiary amyl phenol standard for the nitrosation test. A 1:10 dilution gives a deep cherry red nitrosation color.

Gravimetric analysis gives this material an empirical formula of $C_{23}H_{35}O$.

*Example 2*

Fraction No. 2 in Example 1 was coupled with diazotized sulfonilic acid and an orange color dye was obtained giving a sample of wool a yellow to orange color.

*Example 3*

Fraction No. 2 in Example 1 was also coupled with diazotized nitro aniline giving an orange color oil soluble pigment.

*Example 4*

Fraction No. 2 of Example 1 was also coupled with diazotized Cleve's acid. A reddish-brown dye was obtained.

*Example 5*

Fraction No. 2 of Example 1 was hydrogenated with a nickel catalyst under pressure. A cyclic alcohol was obtained which formed a dinitro benzoyl derivative.

This invention is not limited by any examples or specific methods but only by the following claims in which it is intended to cover the invention as broadly as the prior art permits.

I claim:

1. A composition of matter comprising mixed oil soluble phenolic compounds of petroleum origin unextractable from their source material with aqueous caustic, and having more than 10 carbon atoms per molecule.

2. A composition of matter comprising mixed oil soluble phenolic compounds of petroleum origin unextractable from their source material with aqueous caustic, and having more than 10 carbon atoms per molecule, said compounds being extracted in concentrated form from petroleum oils boiling above 500° F. by means of a strong alkali solution in a substantially anhydrous oil-immiscible solvent selective for phenols and not reactive with strong alkalis.

3. A composition of matter comprising mixed phenolic compounds derived from petroleum, the major portion of which distills between about 313° to 410° F. at 5-10 mm. and has the approximate empirical formula $C_{23}H_{35}O$.

4. Process for obtaining a concentrated phenolic material which comprises extracting a petroleum oil boiling above 500° F. with a strong alkali dissolved in an oil-immiscible solvent selective for phenols and not reactive with the alkali, removing the solvent from the extract, acidifying the residue, and recovering the phenolic material.

5. Process according to claim 4 in which the petroleum oil is first treated with aqueous alkali to remove foreign acidic materials which are soluble in said alkali.

6. Process according to claim 4 in which the petroleum oil is a cracked distillate.

7. Process according to claim 4 in which the petroleum oil is a straight run distillate.

8. Process according to claim 4 in which the petroleum oil is a straight run gas oil.

9. Process according to claim 4 in which the petroleum oil is a straight run gas oil from the class of crudes consisting of East India, South American and Mexican crudes.

10. Process according to claim 4 in which the solvent is a lower water soluble aliphatic alcohol.

11. Process according to claim 4 in which the amount of alkali used is 3% to 15% by weight of the solvent used.

12. Process according to claim 4 in which the amount of solvent is 1% to 10% by volume of the petroleum oil.

13. Process according to claim 4 in which the solvent contains not more than about 5% water.

HYYM E. BUC.